(12) United States Patent
Ajram et al.

(10) Patent No.: US 8,571,509 B2
(45) Date of Patent: Oct. 29, 2013

(54) DYNAMIC SELECTION OF OSCILLATION SIGNAL FREQUENCY FOR POWER CONVERTER

(75) Inventors: Sami Ajram, San Jose, CA (US); Shihab Kuran, Green Brook, NJ (US)

(73) Assignee: Fairchild Semiconductor Corporation, South Portland, ME (US)

( * ) Notice: Subject to any disclaimer, the term of this patent is extended or adjusted under 35 U.S.C. 154(b) by 135 days.

(21) Appl. No.: 12/892,817

(22) Filed: Sep. 28, 2010
(Under 37 CFR 1.47)

(65) Prior Publication Data
US 2011/0014890 A1  Jan. 20, 2011

Related U.S. Application Data

(63) Continuation of application No. 11/827,756, filed on Jul. 13, 2007, now Pat. No. 7,826,815.

(51) Int. Cl.
*H04B 1/10* (2006.01)

(52) U.S. Cl.
USPC ........... 455/299; 455/298; 455/321; 455/206; 348/571

(58) Field of Classification Search
USPC ................ 455/299, 298, 321, 206; 348/571
See application file for complete search history.

(56) References Cited

U.S. PATENT DOCUMENTS

| | | | |
|---|---|---|---|
| 4,479,175 A | 10/1984 | Gille et al. | |
| 6,323,731 B1 | 11/2001 | McCune, Jr. | |
| 7,010,282 B2 | 3/2006 | Kazakevich et al. | |
| 7,826,815 B2 * | 11/2010 | Ajram et al. | ......... 455/299 |
| 2003/0224747 A1 | 12/2003 | Anand | |
| 2004/0072547 A1 | 4/2004 | Axness et al. | |
| 2006/0003730 A1 | 1/2006 | Elder et al. | |
| 2006/0092326 A1 | 5/2006 | Tanabe | |
| 2007/0082641 A1 | 4/2007 | Elder et al. | |

OTHER PUBLICATIONS

Feipeng Wang et al., "Design of Wide-Bandwidth Envelope-Tracking Power Amplifiers for OFDM Applications," IEEE Transactions on Microwave Theory and Techniques, vol. 53, No. 4, Apr. 2005, pp. 1244-1255.

Hsuan-I Pan et al., "Asynchronous Nonlinear Power-Tracking Supply for Power Efficient Linear RF PAs," ICCCAS, 2006, 5 pgs.

PCT Search Report for International Application No. PCT/US2008/008463 (8 pages).

* cited by examiner

*Primary Examiner* — Sanh Phu
(74) *Attorney, Agent, or Firm* — Sidley Austin LLP

(57) ABSTRACT

In one embodiment, a method is provided for providing power to a radio-frequency (RF) component capable of operating under multiple communication standards, wherein each standard has a respective operating frequency. The method includes: receiving a communication standard signal indicative of which of the multiple communication standards the RF component is currently operating under; selecting a frequency for a power converter system in response to the communication standard signal, wherein the selected frequency is higher than a baseband frequency of the current communication standard for the RF component; generating an oscillation signal having the selected frequency; and operating the power converter system with the oscillation signal having the selected frequency to provide power to the RF component, wherein the operation of the power converter system causes minimal interference with the RF component operating under the current communication standard.

22 Claims, 5 Drawing Sheets

DYNAMIC SELECTION OF OSCILLATION SIGNAL FREQUENCY FOR POWER CONVERTER

CROSS-REFERENCE TO RELATED APPLICATION

The present application is a continuation of U.S. patent application Ser. No. 11/827,756, filed Jul. 13, 2007, now U.S. Pat. No. 7,826,815, issued on Nov. 2, 2010, the entirety of which is incorporated by reference herein.

BACKGROUND

1. Field of Invention

The present invention relates to power conversion, and more particularly, to dynamic selection of oscillation signal frequency for a power converter.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS).

In various applications, it is desirable for power converters to be configured to address particular concerns. For example, in portable, battery-operated wireless communication devices (such as cellular telephones, personal digital assistants (PDAs), and laptop computers with wireless capability), it is important for a power converter to be configured to optimize battery life and not generate noise which might interfere with the transmission spectrum. In such communication devices, radio frequency power-amplifiers (RFPAs) are one component which consume a substantial amount of power. Indeed, RFPAs can have such power-intensive demands that they may dominate power consumption over all other components in the systems.

In communication devices implementing or using second generation (2G) and third generation (3G) protocols or standards (e.g., GSM 900, GSM 1900, DCS 1820, UMTS FDD W-CDMA, UMTS Satellite, WiFi 802.11, etc.), high efficiency dynamic voltage biasing (DVB), or Envelop Tracking (ET) power supplies are required to provide or supply power to RFPAs in order to achieve high power efficiency. A DVB power supply is a high-efficiency switched regulator (such as a buck or buck-boost DC-to-DC converter) that adjusts the DC supply level for power to the RFPA according to a desired RF power level. A DVB power supply achieves high power efficiency and increases the autonomy of the battery.

Typically, DC-to-DC converters operating at 1 or 2 MHz are used for such DVB or ET power supplies. However, such converters can be problematic due to their output voltage ripple or noise, which interferes with the output carrier spectrum and creates sideband spurs that degrades Signal/Noise ratio for the adjacent channels. Actually, the RFPA is a non-linear device (especially at high output power level) which causes it to act as a frequency mixer—it mixes the RF input spectrum with the supply voltage spectrum. This results in up converting the DC-DC noise from few MHz to spurs that are placed next to the RF carrier. These spurs can not be filtered because they are too close to the carrier signal.

One way to reduce such noise is to use filtering and electromagnetic interference (EMI) shielding between the SMPS and the RF circuits. But noise filtering and EMI shielding at low switching frequency can require relatively large components and hardware to implement, thus occupying valuable space in the communication device and potentially affecting the size of the device. Furthermore, it is difficult to model the interference paths between the DC-to-DC converter and the transmission spectrum, and to determine with any reasonable degree of accuracy the location and magnitude of the coupling between the power supply and the radio-frequency (RF) components (e.g., RFPA, phase locked loop (PLL), mixer, low-noise amplifier (LNA), etc.). Indeed, analysis for noise filtering is still empirical and requires a very good understanding of the RF circuit architecture, the system noise immunity, and the RF frequency standards.

SUMMARY

According to an embodiment of the present invention, a method is provided for providing power to a radio-frequency (RF) component capable of operating under multiple communication standards, wherein each standard has a respective operating frequency. The method includes: receiving a communication standard signal indicative of which of the multiple communication standards the RF component is currently operating under; selecting a frequency for a power converter system in response to the communication standard signal, wherein the selected frequency is higher than a baseband frequency of the current communication standard for the RF component; generating an oscillation signal having the selected frequency; and operating the power converter system with the oscillation signal having the selected frequency to provide power to the RF component, wherein the operation of the power converter system causes minimal interference with the RF component operating under the current communication standard.

According to another embodiment of the present invention, a power converter system is provided for providing power to a radio-frequency (RF) component capable of operating under multiple communication standards, wherein each standard has a respective operating frequency. The power converter system includes frequency selection circuitry for receiving a communication standard signal indicative of which of the multiple communication standards the RF component is currently operating under. The frequency selection circuitry selects a frequency for the power converter system in response to the communication signal, wherein the selected frequency is higher than a baseband frequency of the current communication standard for the RF component. Power circuitry, coupled to the frequency selection circuitry, operates at the selected frequency to provide power to the RF component. The operation of the power converter system at the selected frequency causes minimal interference with the RF component operating under the current communication standard.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
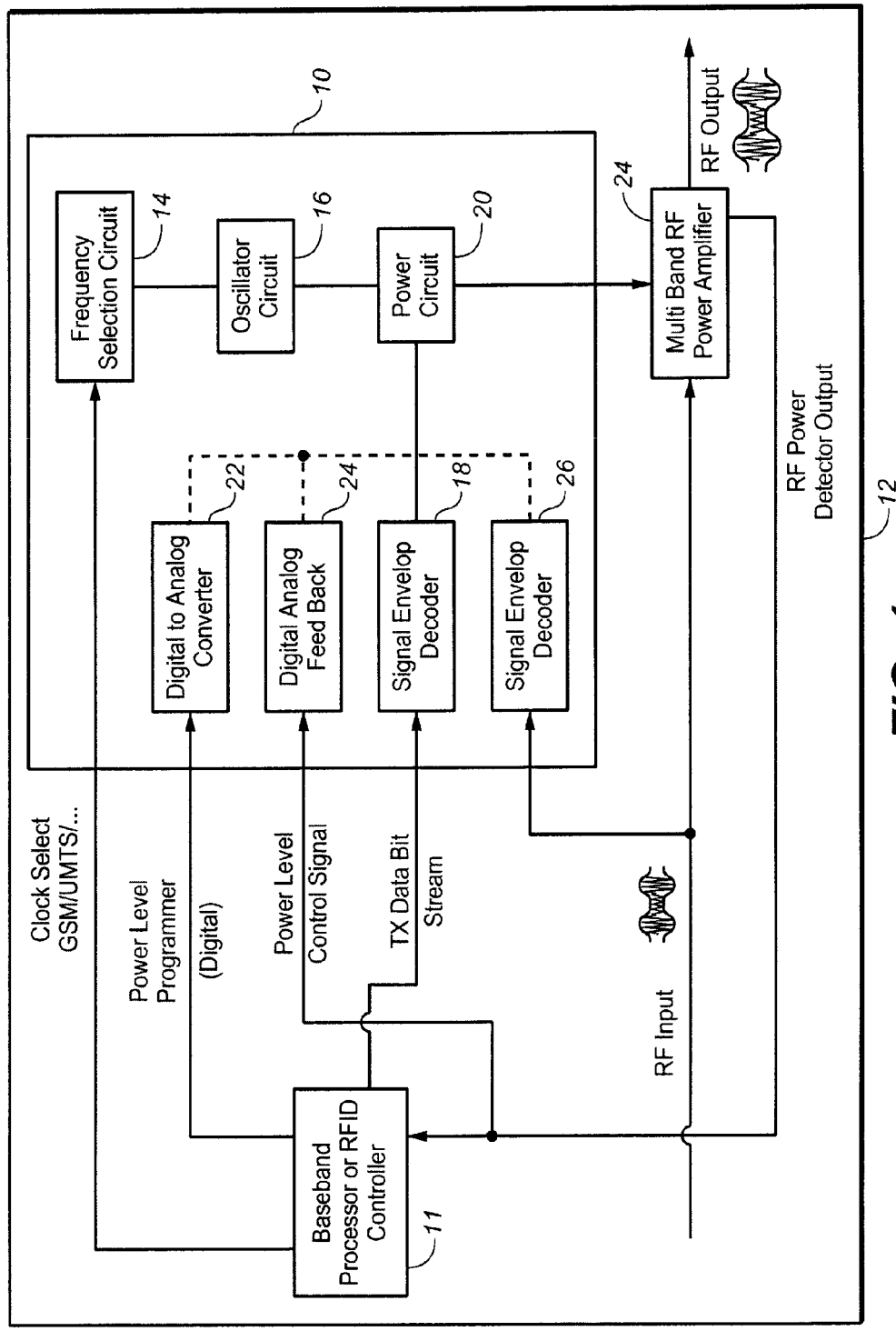
FIG. 1 is a block diagram of an exemplary implementation of a dynamically-clocked power converter system, according to an embodiment of the invention.

Embodiments of the present invention and their advantages are best understood by referring to FIGS. 1 through 6 of the drawings. Like numerals are used for like and corresponding parts of the various drawings.

In various embodiments, the present invention provides or implements improved techniques to provide or supply power to RFPAs, PLLs, LNAs, mixers, or other components in portable devices implementing or using one or more second generation (2G) and third generation (3G) communication protocols or standards (e.g., GSM 900, GSM 1900. DCS 1820, UMTS FDD W-CDMA, UMTS Satellite, WiFi 802.11, etc.). Upon reading this disclosure, a skilled artisan can understand how to implement the present invention without undue experimentation.

In one embodiment, the improved techniques are implemented in a high efficiency dynamically clocked DC-to-DC power converter system, wherein dynamic clocking denotes or comprises dynamic selection of the switching frequency of the power converter system to reduce or minimize interference between front-end analog component and regulator noise generated by the power converter system.

In some embodiments, the selected frequency is higher than the frequency bandwidth of the baseband signal of the portable device, and can meet one of the following conditions:

High enough in order for spurs attributable to fundamental and all harmonics to fall outside the reception (RX) and transmission (TX) bands of the standard or protocol in use (e.g., GSM, DCS, PCS, UMTS etc.).

High enough in order for spurs attributable to fundamental and all harmonics to fall outside the reception (RX) band of the standard or protocol in use (e.g., GSM, DCS, PCS, UMTS etc.).

High enough in order to achieve low inter-modulation ratio with the transceiver carrier (RX and/or TX). In general, a higher DC-DC frequency (as compared to the signal bandwidth of the transmitted channel) causes a lower inter-modulation ratio, which yields a better Adjacent Channel Leakage Rate. This is shown, for example, in FIG. 6, which illustrates the ACLR of a WCDMA power amplifier where the supply is switched at 18.7 MHz.

The power converter systems and corresponding methods, according to embodiments of the invention, implement or utilize a frequency hopping scheme that dynamically selects switching frequencies for the power converter system that complies with or are most suitable for various standard EMI requirements of front-end analog circuits in 2G and 3G portable devices (e.g., RFPAs, PLLs, LNAs, mixers, etc.). The switching frequency for the power converter systems and methods changes each time the portable device changes the communication (RF) standard or protocol. The frequency change could be dictated by an external controller or generated internally using a signal detector able to identify the transceiver operating mode.

In various embodiments, the power converter systems and corresponding methods can be used to supply power to one or more RFPAs of a portable device using 2G and 3G standards or protocols, without any specific (or with minor) supply noise filtering or EMI shielding. With techniques of the present invention, power supply functionality for 2G and 3G RFPAs can be merged in a unique switching regulator. The techniques thus allow a power converter system to be designed for a RF communication device regardless of the particular RF architecture of the device.

The power converter systems and corresponding methods, according to embodiments of the invention, have broad applicability and could be generally applied to analog systems that are sensitive to switched power supply noise.

The systems and methods, according to embodiments of the invention, are an alternative to low efficiency, low dropout (LDO) regulators, since the issue of switching noise is addressed through dynamic clocking. In particular, an LDO regulator is a DC linear voltage regulator which has a very small input-output differential voltage (i.e., the regulator will operate even when the input voltage barely exceeds the desired output voltage). LDO regulators can be used to enlarge dynamic voltage biasing (DVB) bandwidth. The systems and methods according to embodiments of the invention have sufficiently high bandwidth such that it is not necessary to use LDO regulators.

FIG. 1 is a block diagram of an exemplary implementation of a dynamically-clocked power converter system 10, according to an embodiment of the invention. Power converter 10 can be incorporated in or used with any electronic device in which a power converter as described herein is needed. As shown, power converter system 10 is incorporated, used, or applied in a communication system 12. Such communication system 12 can be a portable, battery-operated device, such as a cellular telephone, personal digital assistant (PDA), and laptop computer with wireless capability, and the like, capable of (wireless) communication using one or more suitable standards or protocols, such as GSM, DCS, WCDMA, UMTS, TD/CDMA, WiFi, WiMax, and the like. During operation, the communication system 12 may switch from one standard or protocol to another, for example, depending on network availability, location, signal strength, user preference, service provider preference, etc. Each standard or protocol may have a respective frequency spectrum (baseband, reception (RX), and transmission (TX)), examples of which are given in the table below.

| Standard/Protocol | RX Band | TX Band | Duplex Spacing |
|---|---|---|---|
| GSM 900 | 25 MHz | 25 MHz | 45 MHz |
| DCS1820 | 65 MHz | 65 MHz | 95 MHz |
| GSM 1900 | 65 MHz | 65 MHz | 95 MHz |
| UMTS FDD W-CDMA | 60 MHz | 60 MHz | 190 MHz |
| UMTS TDD, TD/CDMA | 20 MHz | 15 MHz | 0 MHz |
| UMTS Satellite | 30 MHz | 30 MHz | 190 MHz |

| Standard/Protocol | RX Band | TX Band | Duplex Spacing |
|---|---|---|---|

Power converter system 10 includes a baseband processor or radio-frequency identification (RFID) controller 11. Controller 11 may select the protocol or standard which communication system 12 uses at any given moment.

In general, power converter system 10 can provide power (e.g., direct current (DC)) for one or more components of the communication system 12, such as a radio-frequency power amplifier (RFPA), phase locked loop (PLL), low-noise amplifier (LNA), mixer, or other analog RF component 24. Power converter system 10 may operate at different frequencies depending on the communication standard or protocol which the communication system 12 is currently using. At any given moment, the operating frequency of the power converter system 10 is selected so as to reduce or minimize the interference between front-end, analog RF components of the communication system 12 and the regulator noise generated by the power converter system 10. In one embodiment, the operating frequency of the power converter system 10 is selected to be higher than the frequency bandwidth of the baseband signal for the current communication standard or protocol (e.g., GSM, DCS, PCS, UMTS etc.) of the communication system 12, and high enough to cause the fundamental and all harmonic spurs to fall outside the reception (RX) and/or transmission (TX) bands of the standard or protocol in use.

As shown, power converter system 10 includes a frequency selection circuit 14, an oscillator circuit 16, a signal envelop decoder circuit 18, and a power circuit 20. Power converter system 10 may optionally include a digital to analog converter 22, a direct analog feed back circuit 24, and a signal envelop decoder 26. The frequency selection circuit 14 receives a communication standard signal which identifies or otherwise provides an indication of the communication standard or protocol which the communication system 12 is currently using (e.g., GSM, DCS, WCDMA, UMTS, TD/CDMA, WiFi, and which version). This communication standard signal may come from, for example, the baseband microprocessor of the communication system 12. The frequency selection circuit 14 uses or processes the received communication standard signal to select some operating frequency for power converter system 10. Frequency selection circuit 14 outputs a control signal to the oscillator circuit 16. In one embodiment, frequency selection circuit 14 can be implemented with a look-up table having a number of entries which can be accessed or addressed using the received communication standard signal.

Oscillator circuit 16 is coupled to the frequency selection circuit 14. As used herein, the terms "coupled" or "connected," or any variant thereof, covers any coupling or connection, either direct or indirect, between two or more elements. Oscillator circuit 16 is operable to generate one or more oscillation signals at different frequencies. In one embodiment, for example, oscillator circuit 16 may comprise a tunable oscillator circuit which outputs a single oscillation signal, the frequency of which can be adjusted. In another embodiment, oscillator circuit 16 may comprise a plurality of PLL circuits, each of which outputs a respective oscillation signal at a particular (different) frequency. In response to the control signal from frequency selection circuit 14, oscillation circuit 16 outputs an oscillation or clock signal at a selected frequency. In one embodiment, depending on the communication standard or carrier protocol (e.g., GSM, DCS, WCDMA, UMTS, TD/CDMA, WiFi, and which version), the frequency selection circuit 14 drives a PLL or the tunable free running oscillator of oscillator circuit 16 in order to select the frequency that meets the requirements for the carrier protocol.

Signal envelope decoder circuit 18 determines the RF envelope for the RF signal under the current communication standard or protocol for the communication system 12. The RF envelope provides an indication of the RF power level. Signal envelope decoder circuit 18 receives a signal, such as a bit stream signal or the RF signal, which can be used to determine the RF envelope. The bit stream signal may include information for the phase and amplitude of the RF signal. Signal envelope decoder circuit 18 processes the bit stream signal and RF input signal and, in response, outputs a control signal for modulating output power (voltage) of the power converter circuit 10 according to the RF envelope. In one embodiment, for example, signal envelope decoder circuit 18 may decode the bit stream signal to determine the appropriate modulation. The signal envelope decoder circuit 18 can be implemented with a digital-to-analog converter (DAC) or any other suitable circuitry.

In one embodiment, as shown in FIG. 1, a power converter system 10 can use a feed-forward scheme for the RF envelope determination—i.e., the system anticipates what changes will be needed for the RF signal and provides an appropriate correction or control signal to adjust the RF output in advance. The feed-forward scheme can be implemented with one or more of signal envelop decoder circuit 18, digital to analog converter 22, direct analog feed back circuit 24, and signal envelop decoder 26.

Figure 2:
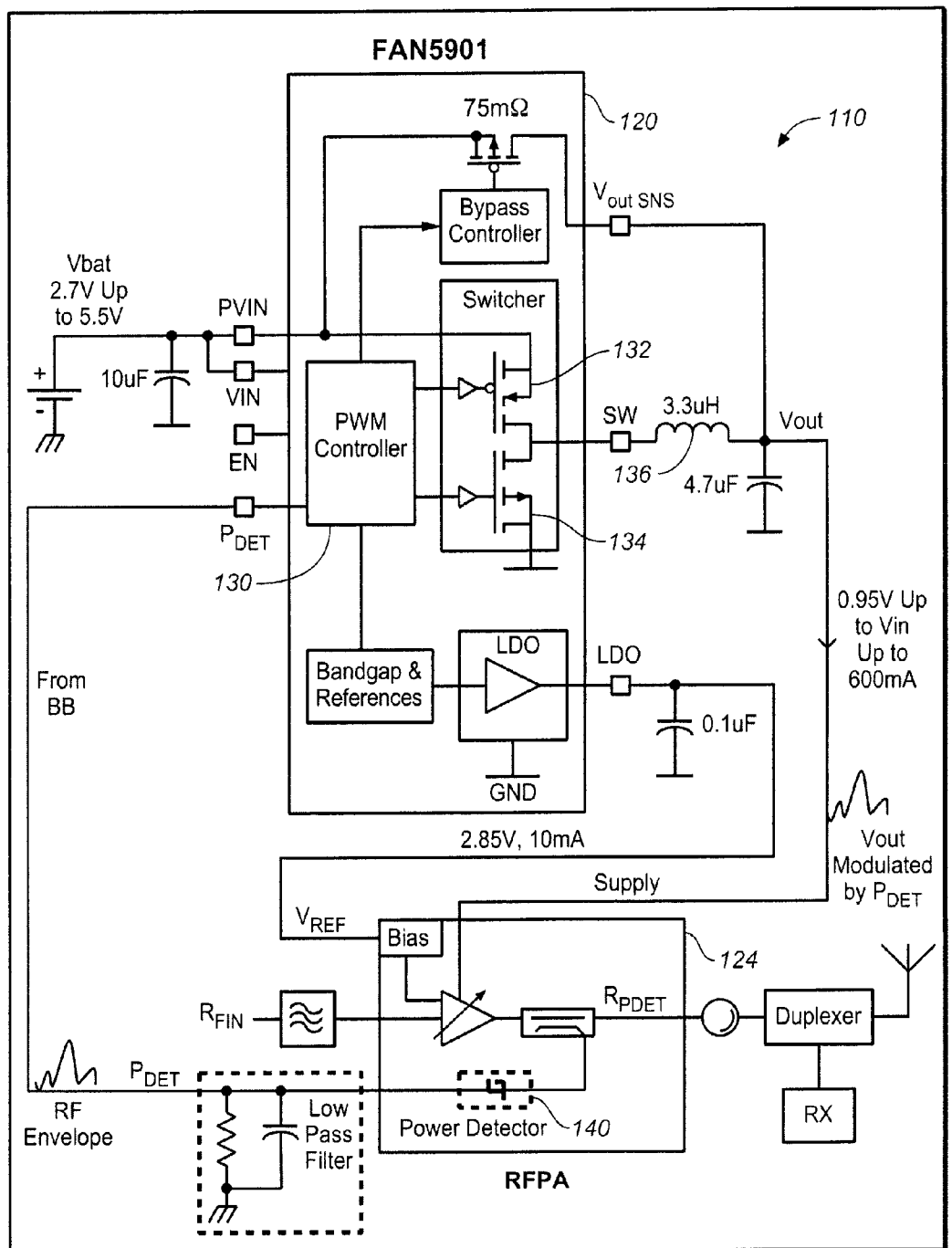
FIG. 2 is a schematic diagram, in partial block form, of another exemplary implementation of a dynamically-clocked power converter system, according to an embodiment of the invention.

In another embodiment, such as illustrated in FIG. 2, a feed-back scheme is used. With a feed-back scheme, the RF output is returned to the control circuitry. For example, a power detector provides a voltage signal that is indicative or a function of the RF output power. In such an embodiment, power converter system generates control or correction signals as a function of the RF output.

The power circuit 20 provides a power output for one or more components of the communication system 12, such as a radio-frequency power amplifier (RFPA), phase locked loop (PLL), low-noise amplifier (LNA), mixer, or other analog RF component 24. The power circuit 20 can be implemented using one or more switching devices, such as transistors (e.g., MOSFETs), which are turned on and off to deliver power at the output of the converter system 10. Control circuitry is provided to regulate the turning on and off of the switching devices, and thus, the power circuit 20 converter can be a "switching regulator" or "switching converter." The power circuit 20 may also include one or more capacitors or inductors for alternately storing and outputting energy. In various embodiments, power converter circuit 20 can be DC-to-DC converter circuit, such as a synchronous buck converter, a boost converter, or a buck-boost converter. The power circuit 20 may employ pulse width modulation (PWM), which varies the width of the pulse in a periodic signal for turning on and off the switching devices in a power converter. With PWM controlled regulators, the frequency is held constant and the width of each pulse is varied to form a fixed-frequency, variable-duty cycle operation. The output of the PWM circuitry of power circuit 20 is used to control the switching of the switching devices. In one embodiment, converter circuit 20 can be implemented as a dynamic voltage biasing (DVB) supply, which is a high efficiency switched regulator that adjusts the RFPA DC supply level according to it RF power level in order to achieve the highest power efficiency and increase the autonomy of the battery.

The power circuit 20 is coupled to the oscillator circuit 16 and the signal envelope decoder circuit 18, and receives the signals therefrom. The oscillation or clocking signal from oscillator circuit 16 sets the switching frequency for the power circuit 20. That is, the switching devices of power circuit 20 are turned on or off at the frequency of the oscillation signal to deliver power at the output. The switching or oscillation frequency selected for the power circuit 20 is such that interference between transmission spectrum of the communication system 12 and the regulator noise generated by the power converter system 10 is reduced or minimized. Power circuit 20 uses the power control signal from the signal envelope decoder circuit 18 to modulate the duty cycle of the power circuit 20, thereby controlling the output voltage.

In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, oscillator circuit 16 and power circuit 20 are implemented on one die; frequency selection circuit 14 and signal envelope decoder circuit 18 are implemented on another die.

FIG. 2 is a schematic diagram, in partial block form, of another exemplary implementation of a dynamically-clocked power converter system 110, according to an embodiment of the invention. Power converter system 110 is incorporated, used, or applied in a communication system 112, which can be a portable, battery-operated device, such as a cellular telephone, personal digital assistant (PDA), and laptop computer with wireless capability, and the like, capable of switching between multiple communication standards or protocols, such as GSM, DCS, WCDMA, UMTS, TD/CDMA, WiFi, and the like, during operation.

Power converter system 110, which includes a power integrated circuit (IC) 120, provides power (e.g., direct current (DC)) for one or more components of the communication system 12, such as a radio-frequency power amplifier (RFPA), phase locked loop (PLL), low-noise amplifier (LNA), mixer, or other analog RF component 124. The power IC 120 includes first and second switches 132, 134 connected in a half-bridge arrangement and controlled by a PWM controller 130. An inductor 136 is coupled to the half-bridge arrangement at a switching node. Current flows from the first switch 132 through the inductor 136 to provide an output voltage Vout to the RF component 124.

As shown, power converter system 110 utilizes a feed-back scheme or regulation loop for RF envelope detection. In this embodiment, a power detector 140 (which can be part of the RF component 124) returns a signal that is indicative or a function of the RF output power to the control circuitry (including PWM controller 130). The power converter system 110 generates control or correction signals as a function of the RF output.

Figure 3:
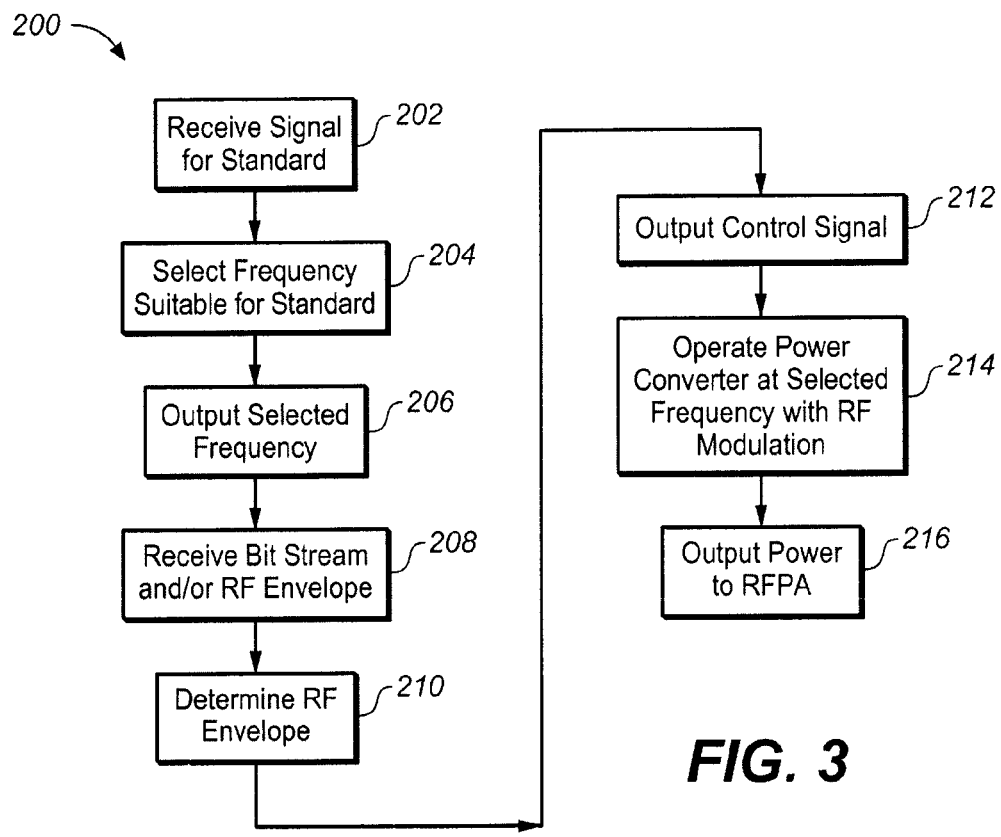
FIG. 3 is a flow diagram of exemplary method for a dynamically-clocked power converter system, according to an embodiment of the invention.

FIG. 3 is a flow diagram of exemplary method 200 for a dynamically-clocked power converter system, according to an embodiment of the invention. Method 200 provides dynamic clocking and frequency hopping for a power converter system in a communication system capable of switching between multiple communication standards or protocols, such as GSM, DCS, WCDMA, UMTS, TD/CDMA, WiFi, and the like, during operation. In one embodiment, method 200 may be performed in or implemented by the power converter system 10 used or incorporated in a communication system 12 (as shown and described in FIG. 1), or by power converter system 110 used or incorporated in communication system 112 (as shown and described in FIG. 2). For clarity, the remainder of the description for method 200 will be discussed with respect to the power converter system 10 of FIG. 1, although it should be appreciated that the description is equally appropriate for the power converter system 110 of FIG. 2.

Method 200 begins at block 202 where the power converter system 10 receives a signal which identifies or otherwise provides an indication of the communication standard or protocol which the communication system 12 is currently using, such as, for example, GSM 900, GSM 1900. DCS 1820, UMTS FDD W-CDMA, UMTS Satellite, WiFi 802.11, etc. Each communication standard or protocol has a respective frequency spectrum for baseband, reception (RX), and transmission (TX) signaling.

At block 204, frequency selection circuit 14 of power converter system 10 processes the communication standard signal, for example, using look up table, to select some operating frequency for power converter system 10. The frequency selection circuit 14 selects a frequency for the power converter system 10 so as to reduce or minimize the interference between communication system 12 (operating in its current frequency spectrum) and the regulator noise generated by the power converter system 10. The selected operating frequency can be higher than the frequency bandwidth of the baseband signal. In particular, the frequency is dynamically selected to be appropriate for the current operating protocol (e.g., GSM, UMTS, DCS, 802.11b, 802.11b+, etc.). The widest reception (RX) or transmission (TX) bandwidth is 65 MHz for the DCS standard and 83 MHz for 802.11g standard. The frequency selection circuit 14 outputs a control signal which is provided to the oscillator circuit 16.

At block 206, in response to the control signal, oscillator circuit 16 outputs an oscillation or clock signal at the selected frequency. In one embodiment, oscillator circuit 16 may comprise a tunable oscillator circuit which outputs a single oscillation signal, the frequency of which is adjusted by the control signal from the frequency selection circuit 14. In another embodiment, oscillator circuit 16 may comprise a plurality of PLL circuits, each of which outputs a respective oscillation signal at a particular (different) frequency. The control signal from the frequency selection circuit 14 causes the oscillation signal from one of the PLL circuits to be output. The oscillation or clock signal output from the oscillator circuit 15 is provided to the power circuit 20.

At block 208, signal envelope decoder circuit 18 of power converter system 10 receives a signal, such as bit stream signal or a RF signal, which can be used to determine the RF envelope. At block 210, signal envelope decoder circuit 18 determines the RF envelope, for example, with either feed-forward or feedback control. At block 212, signal envelope decoder circuit 18 outputs a power control signal to the power circuit 20.

Figure 4:
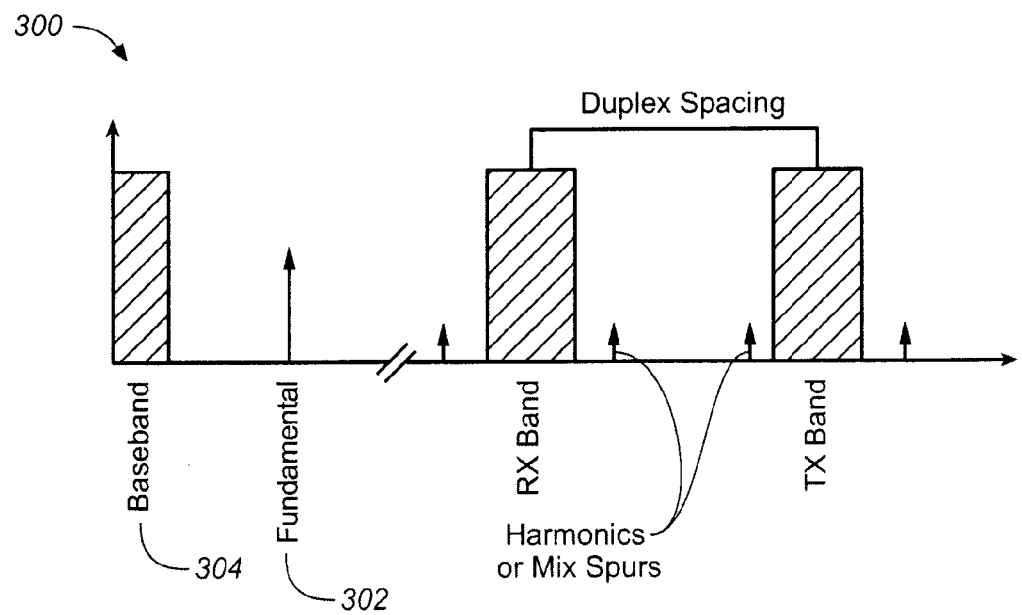
FIG. 4 is a diagram of a frequency spectrum for a communication device using or incorporating embodiments of the invention.

At block 214, the power circuit 20, which can be a DC-to-DC converter having one or more switching devices (e.g., transistors), is operated at the selected oscillation frequency output from the oscillator circuit 16. As such, the power circuit 20 is switched at a frequency higher than the frequency bandwidth of the baseband signal of the current standard or protocol. The frequency for the power circuit 20 would be, for example, above 83 MHz (worst case) for the 802.11g standard. For standards in which the bandwidth is smaller, the power circuit 20 can be clocked or switched at a lower frequency. In one embodiment, the selected frequency is high enough so that the spurs which are caused by power circuit 20 harmonics mixing with RF carriers all or mostly fall out of both the RX and TX bands (as illustrated in FIG. 4). Thus, operation of the power circuit 20 at the selected frequency minimizes or reduces interference with the frequency spectrum of the standard or protocol which the communication system 12 is currently using. The duty cycle for the converter circuit 20 is controlled in response to the power control signal from the signal envelope decoder circuit 18, and thus the power output level may follow the RF signal amplitude based on either bit stream decoding or envelope detection.

At block 216, the power circuit 20 outputs power to the analog RF component 24, such as radio-frequency power amplifier (RFPA), phase locked loop (PLL), low-noise amplifier (LNA), mixer, or other component.

Power converter system 10 may repeat method 200 each time that communication device 12 switches or changes from one communication standard or protocol to another. Whenever such a change occurs, power converter system 10 will select a suitable switching frequency in order to minimize or reduce interference with the frequency spectrum of the current standard or protocol.

FIG. 4 is a diagram 300 of a frequency spectrum for a communication device using or incorporating embodiments of the invention. As shown in FIG. 4, in such a communication device, the fundamental or operating frequency for a power converter is higher than the baseband frequency of the current communication standard or protocol. Furthermore, the harmonics or spurs which are caused by the mixing of the power converter operating frequency and the baseband frequency of the current communication standard fall outside of the reception (RX) and transmission (TX) bands of the communication standard.

Figure 5:
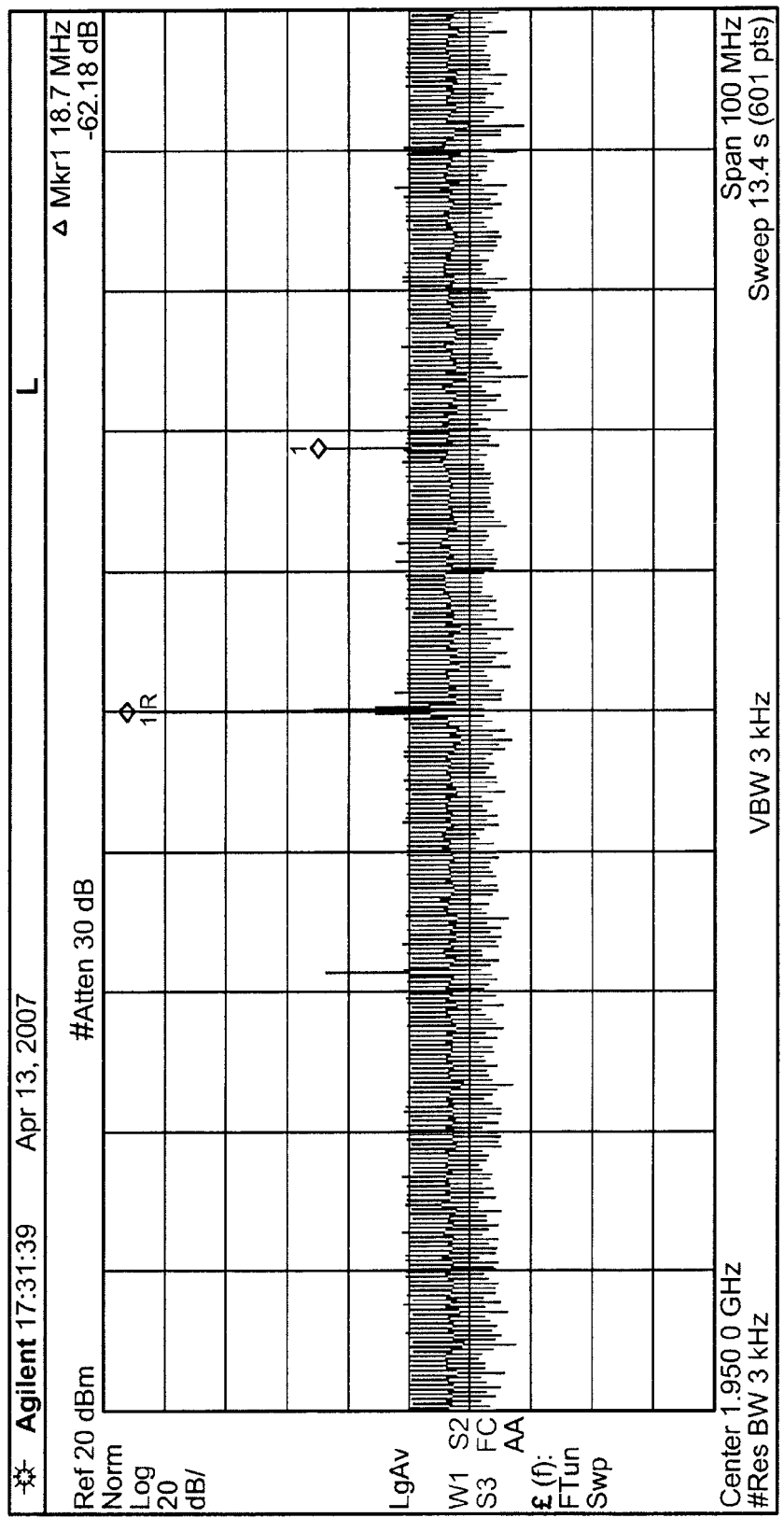
FIG. 5 is a diagram illustrating spurs generated in a communication device using or incorporating embodiments of the invention.

FIG. 5 is a diagram illustrating spurs generated in a communication device using or incorporating embodiments of the invention. The spurs, which can be generated by the power circuit 20, are next to the RFPA carrier signal in Continuous Wave mode. This can be due to intermodulation inside the radio frequency power-amplifiers (RFPA) 24.

Figure 6:
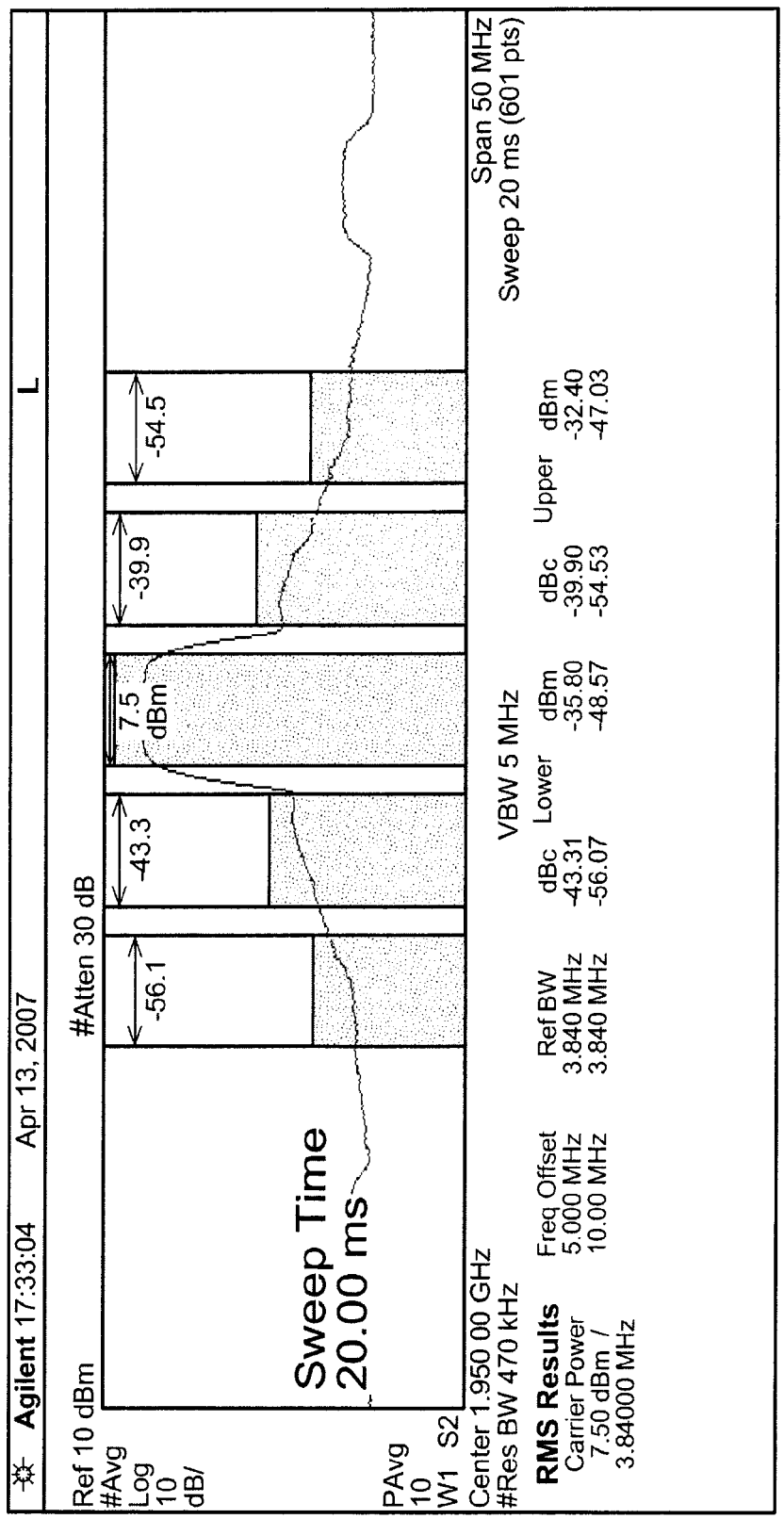
FIG. 6 is a diagram illustrating Adjacent Channel Leakage Rate (ACLR) in a communication device using or incorporating embodiments of the invention.

FIG. 6 is a diagram illustrating Adjacent Channel Leakage Rate (ACLR) in a communication device using or incorporating embodiments of the invention. The ACLR, which can be induced by the power circuit 20, is next to the RFPA carrier signal in WCDMA mode of operation. FIG. 6 shows the ACLR of a WCDMA PA where the supply is switched at 18.7 MHz. This frequency is high enough in order to achieve low inter-modulation ratio with the transceiver carrier (RX and/or TX). In general, a higher DC-DC frequency (as compared to the signal bandwidth of the transmitted channel) causes a lower inter-modulation ratio, which yields a better ACLR.

The power converter systems and method, according to embodiments of the invention, can be used in applications such as 2G, 3G, or higher generation communication devices with DVB supplies. In general, the power converter systems and methods find application in any analog systems that are sensitive to switching noise, which can include for example, medical devices utilizing large-band analog-to-digital converters (ADCs) and digital-to-analog converters (DACs), video/audio acquisition systems, etc.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A method for providing power to a communications device capable of operating under multiple communication standards, wherein each standard has a respective operating radio-frequency, the method comprising:
    determining which of the multiple communication standards the communications device is currently operating under;
    selecting a frequency for a power converter system of the communications device that is higher than a baseband frequency of the current communication standard for the communications device; and
    operating the power converter system with an oscillation signal having the selected frequency to provide power to the communications device, wherein the operation of the power converter system causes minimal interference with the operating radio-frequency of the current communication standard.

2. The method of claim 1 wherein the communications device comprises one of a RF power amplifier, a phase locked loop, a mixer, and a low-noise amplifier.

3. The method of claim 1 wherein operating the power converter system with the oscillation signal having the selected frequency comprises switching one or more switching devices of the power converter system at the selected frequency.

4. The method of claim 1 comprising receiving a signal indicative of a radio-frequency (RF) envelope.

5. The method of claim 4 comprising developing a power control signal in response to the signal indicative of a RF envelope.

6. The method of claim 5 comprising controlling a duty cycle of the power converter system in response to the power control signal.

7. The method of claim 5 wherein developing a power control signal comprises using a feed-forward control scheme.

8. The method of claim 5 wherein developing a power control signal comprises using a feed-back control scheme.

9. The method of claim 1 wherein the multiple communication standards comprises two or more of GSM, DCS, PCS, UMTS, or 802.11 standards.

10. The method of claim 1 wherein selecting a frequency for the power converter system comprises referencing a look-up table.

11. The method of claim 1 comprising generating the oscillation signal having the selected frequency.

12. The method of claim 11 wherein generating the oscillation signal comprises adjusting a tunable oscillator to provide the oscillation signal.

13. The method of claim 11 wherein generating the oscillation signal comprises selecting one of a plurality of phase locked loop (PLL) circuits.

14. The method of claim 1 comprising receiving a communication standard signal indicative of which of the multiple communication standards the communication device is currently operating under.

15. A power converter system for providing power to a communications device capable of operating under multiple communication standards, wherein each standard has a respective operating radio-frequency, the power converter system comprising:

frequency selection circuitry for determining which of the multiple communication standards the communications device is currently operating under, the frequency selection circuitry for selecting a frequency for the power converter system that is higher than a baseband frequency of the current communication standard for the communications device; and power circuitry coupled to the frequency selection circuitry, the power circuitry operating at the selected frequency to provide power to the communications device, wherein the operation of the power converter system at the selected frequency causes minimal interference with operating radio-frequency of the current communication standard.

16. The power converter system of claim 15 comprising oscillator circuitry coupled to the frequency selection circuitry, the oscillator circuitry for generating an oscillation signal having the selected frequency.

17. The power converter system of claim 15 wherein the communications device comprises one of a RF power amplifier, a phase locked loop, a mixer, and a low-noise amplifier.

18. The power converter system of claim 15 wherein the multiple communication standards comprises two or more of GSM, DCS, PCS, UMTS, or 802.11 standards.

19. The power converter system of claim 15 wherein the power converter system is operable to reference a look-up table for selecting the frequency.

20. The power converter system of claim 15 comprising an oscillator for generating an oscillation signal having the selected frequency.

21. The power converter system of claim 20 wherein the oscillator comprises a tunable oscillator.

22. The power converter system of claim 20 wherein the oscillator comprises a plurality of phase locked loop (PLL) circuits.

\* \* \* \* \*